UNITED STATES PATENT OFFICE.

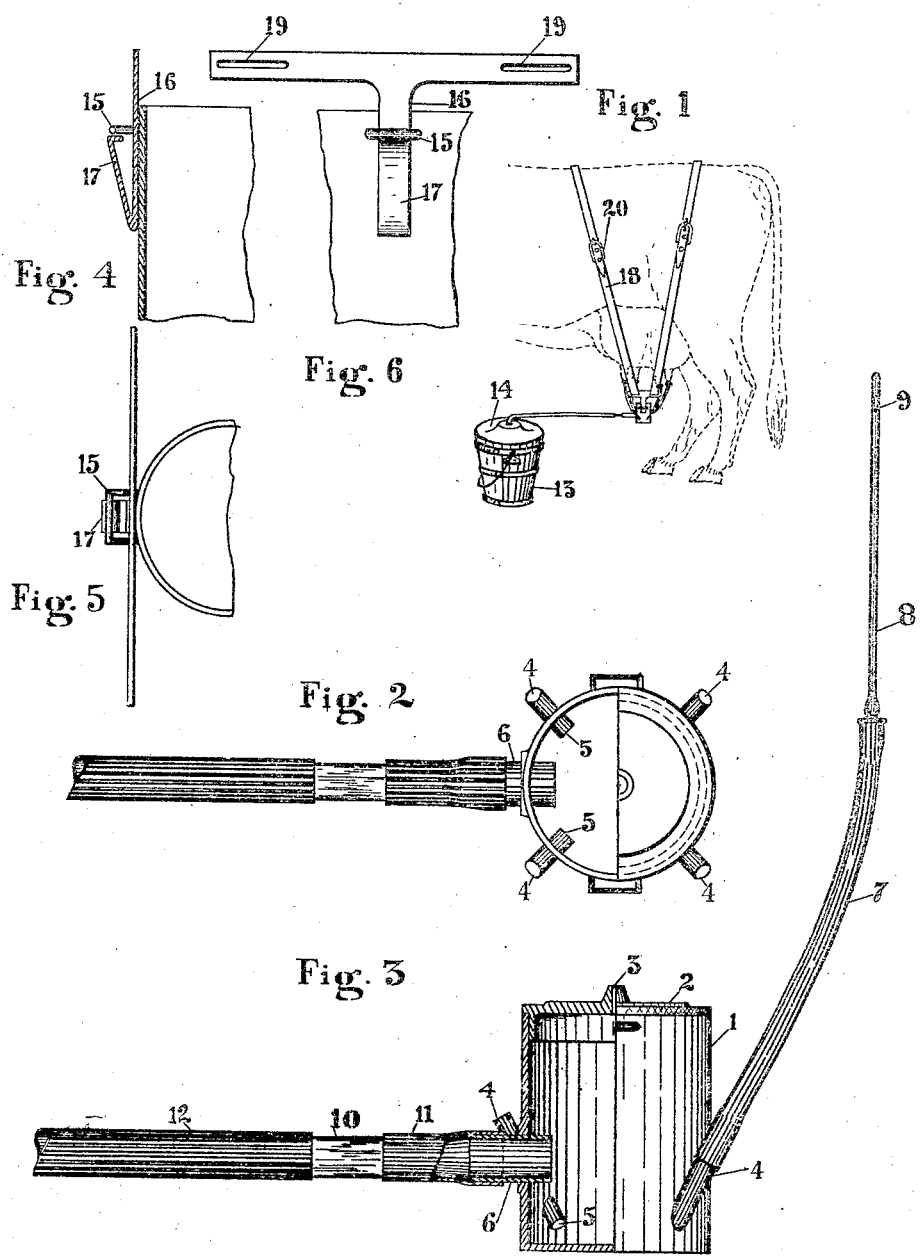

FRANK B. SHAFER, OF NORTHVILLE, MICHIGAN.

MILKING-MACHINE.

No. 915,312.

Specification of Letters Patent.

Patented March 16, 1909.

Application filed July 27, 1908. Serial No. 445,696.

*To all whom it may concern:*

Be it known that I, FRANK B. SHAFER, a citizen of the United States of America, residing at Northville, in the county of Wayne and State of Michigan, have invented certain new and useful Improvements in Milking-Machines, of which the following is a specification, reference being had therein to the accompanying drawings.

This invention relates to milking devices wherein the milk tubes are inserted in the teats, and the milk drawn off without use of pulsators, or other like mechanical aids, and more especially to certain arrangements and disposition of the parts whereby irritation of the inner membranes of the udder is avoided.

The invention consists in the matters hereinafter set forth and more particularly pointed out in the appended claims.

In the drawings, Figure 1 is a view of a device embodying features of the invention, in operative position. Fig. 2 is a plan view in detail, with parts removed, of a regulating collector. Fig. 3 is a view in detail of the collector partly in elevation and partly in section, with one of the milk tubes in place. Figs. 4, 5 and 6 are views in detail of a supporting snap hanger.

Referring to the drawings, a cylindrical collector casing 1 with closed lower end and removable cover 2 having an air vent 3 therethrough, is provided with symmetrically disposed inlet pipes 4 in its wall, whose downturned, lower discharge ends 5 are close to the casing bottom. An outlet pipe 6 is formed on or secured in the casing with its intake well above the inlet pipes 4. Flexible milk tubes 7 of rubber or the like are secured on the pipes 4 and carry slender nipples 8 with lateral intake apertures 9 and axial ducts, the nipples being proportioned for insertion in the teats of an animal. The tubes 7 are sufficiently stiff to hold the nipples in upright position so that there is no side pressure on the wall of the teat duct. A short observation glass 10 is removably connected to the outer end of the outlet pipe 6 by suitable means, as a rubber tube 11, and a hose 12 leads from the glass to a suitable receptacle 13 with cover 14 through which the hose discharges.

A pair of oppositely disposed ears or loops 15 near the upper rim of the casing are each adapted to be engaged by a tee-shaped hanger 16 of spring metal whose lower end is adapted to interlock with the loop, preferably being reverted and inturned, the resultant spring arm 17 snapping by the loop when pushed through. A pair of surcingles 18 are each secured at the ends in slots 19 in the hanger arms and have buckles 20 or like means for adjustably securing them in place.

In operation, the device is adjusted as indicated in Fig. 1, the two surcingles and wide tee hangers holding the collector from swinging, and the flexible nipple supports preventing any side pressure on the teat ducts. The milk which passes through the collector, seals the milk tubes, and thus air cannot enter, in case one quarter of the udder is drained before the others, as usually occurs. As a consequence, the delicate inner membranes do not become inflamed and the yield of milk is not affected, the animal readily becoming accustomed to the apparatus.

The device may be readily sterilized and has no complicated parts to be put out of order, and is effective.

Obviously, changes in the details of construction may be made without departing from the spirit of the invention and I do not care to limit myself to any particular form or arrangement of parts.

What I claim as my invention is:—

1. A device for the purposes specified comprising a closed collector having a plurality of inlet tubes, an outlet above the level of the inlet tube discharge ends, a teat nipple yieldingly secured on each inlet tube in an upright position, a hose leading from the collector outlet, a pair of oppositely disposed hangers detachably secured to the collector and a pair of surcingles connecting opposite arms of the hangers.

2. A device for the purposes specified comprising a collector consisting of an upright cylindrical casing closed at its lower end, a cover detachably secured on the casing having an air vent, a plurality of inlet tubes opening into the casing, and an outlet above the level of the inlet tube discharge ends, a flexible upright supporting tube extending from the outer end of each inlet tube, an insertible teat nipple terminating each supporting tube, a hose leading from the collector outlet, a pair of oppositely disposed ears near the upper end of the collector, a hanger detachably engaging each ear and a pair of surcingles connecting opposite ends of the hangers.

3. A device for the purposes specified comprising a collector consisting of an upright cylindrical casing closed at its lower end, a cover detachably secured on the casing having an air vent, a plurality of inlet tubes opening into the casing, and an outlet above the level of the inlet tube discharge ends, a flexible upright supporting tube extending from the outer end of each inlet tube, an insertible teat nipple terminating each supporting tube, a hose leading from the collector outlet, a pair of oppositely disposed ears near the upper end of the collector, a tee-shaped hanger of spring metal having a depending reverted and inbent end adapted to snap by an ear when inserted therein and a horizontal arm provided with a longitudinal slot near each end, and surcingles connecting corresponding ends of the hangers secured in the said slots.

In testimony whereof I affix my signature in presence of two witnesses.

FRANK B. SHAFER.

Witnesses:
OTTO F. BARTHEL,
ANNA M. DORR.